United States Patent
Kunkel et al.

(10) Patent No.: US 7,077,041 B2
(45) Date of Patent: Jul. 18, 2006

(54) SYSTEMS AND METHODS FOR CUTTING MULTI-WALLED CORRUGATED MATERIAL

(75) Inventors: Arden L. Kunkel, Tacoma, WA (US); Myron Sangren, Lynden, WA (US)

(73) Assignee: Weyerhaeuser Company, Federal Way, WA (US)

( * ) Notice: Subject to any disclaimer, the term of this patent is extended or adjusted under 35 U.S.C. 154(b) by 67 days.

(21) Appl. No.: 10/749,455

(22) Filed: Dec. 31, 2003

(65) Prior Publication Data

US 2005/0139049 A1    Jun. 30, 2005

(51) Int. Cl.
  *B26D 1/54* (2006.01)
  *B27B 13/10* (2006.01)
(52) U.S. Cl. .............................. 83/34; 83/814; 83/820
(58) Field of Classification Search .................. 83/820, 83/814, 846, 848, 851, 168, 34
  See application file for complete search history.

(56) References Cited

U.S. PATENT DOCUMENTS

| | | | | |
|---|---|---|---|---|
| 3,643,536 A | * | 2/1972 | Alexander | 83/820 |
| 3,979,988 A | * | 9/1976 | Best | 83/820 |
| 4,342,241 A | * | 8/1982 | Eklund | 83/56 |
| 4,913,022 A | * | 4/1990 | Kuklinski | 83/849 |
| 5,231,909 A | * | 8/1993 | Hsu | 83/835 |
| 5,410,934 A | * | 5/1995 | Krippelz | 83/820 |
| 6,202,528 B1 | * | 3/2001 | Morgan | 83/824 |
| 6,439,094 B1 | * | 8/2002 | Yoneda et al. | 83/835 |
| 2004/0103773 A1 | * | 6/2004 | Helshoj | 83/820 |
| 2005/0081690 A1 | * | 4/2005 | Biro | 83/168 |

* cited by examiner

Primary Examiner—Charles Goodman
(74) Attorney, Agent, or Firm—Christensen, O'Connor, Johnson & Kindness

(57) ABSTRACT

A cutting system includes a bandsaw employing a saw blade with an improved cutting edge. The system may employ an upper tensioning assembly and/or a lower tensioning assembly to offset the blade with respect to conventional bandsaw arrangements for applying a continuous tensioning force against the blade during use. In use, the system increases the quality of the cut and provides a straighter cut while decreasing the amount of dust generated in the cutting process as compared to conventional methods, namely, the use of circular saws.

18 Claims, 6 Drawing Sheets

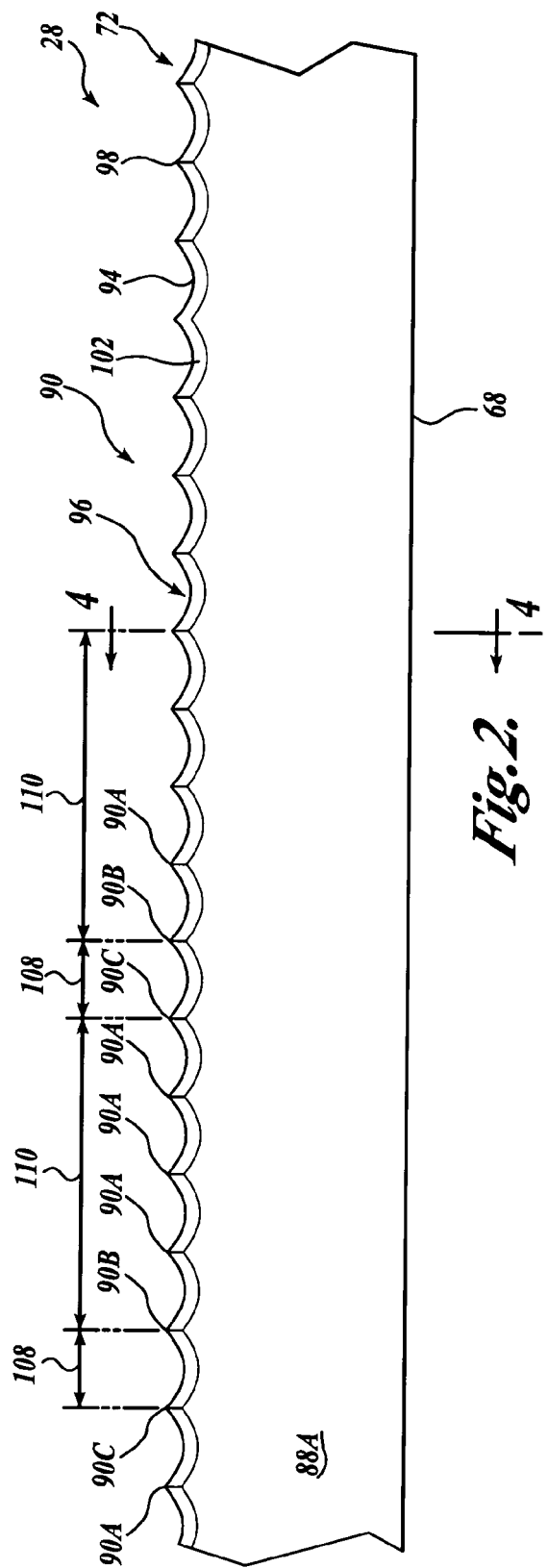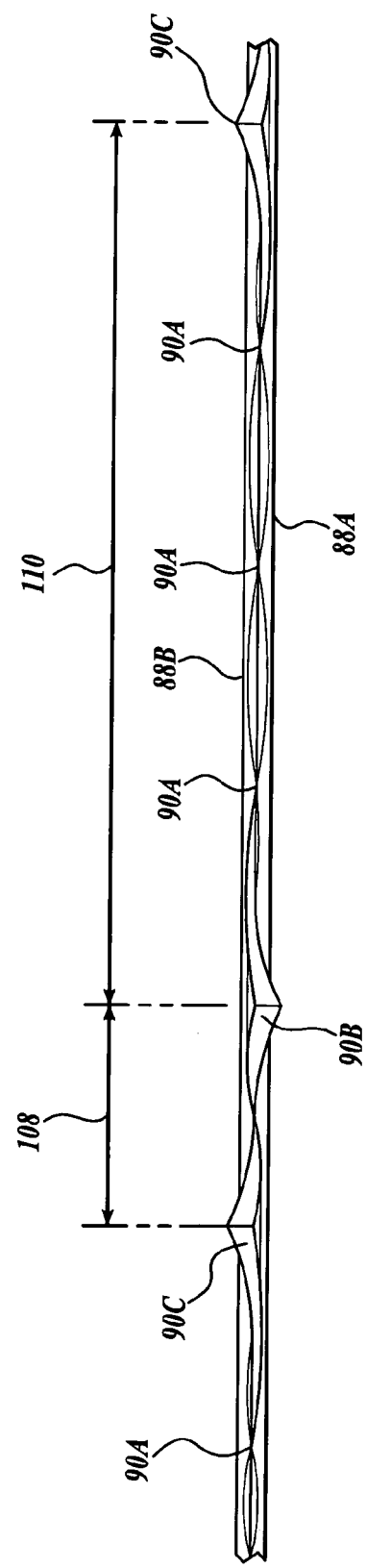
Fig.2.
Fig.3.

SYSTEMS AND METHODS FOR CUTTING MULTI-WALLED CORRUGATED MATERIAL

FIELD OF THE INVENTION

The present invention relates to systems and methods for cutting layered fibrous material, such as multi-walled corrugated material, and more particularly, to systems and methods that utilize bandsaws and improved bandsaw blades for cutting layered fibrous material.

BACKGROUND OF THE INVENTION

Multi-layered material, such as multi-walled corrugated material up to 20 plies, has been used in the packaging industry for many years due to its large compression strength. Currently, such multi-layered material is cut in industrial settings with circular saws employing ¼ inch thick blades having carbide teeth with an alternating set (i.e.; left set, right set, left set, etc.). While this method provides a straight cut, which is important in the packaging industry, the use of circular saws having blades with these characteristics causes a few problems. For example, the use of circular saws having a ¼ inch thick blade and alternatingly set teeth creates a large kerf, which generates large quantities of dust and results in cuts of poor quality, which is unacceptable in many packaging applications.

Therefore, there is a need in the industry for an improved cutting system and method that reduces the quantity of dust, improves cut quality, and allows for a straighter cut.

SUMMARY OF THE INVENTION

In accordance with aspects of the present invention, a system for cutting a multi-walled material is provided. The system includes a frame, a worktable supported on the frame, a pair of wheels rotatably carried by the frame; and a bandsaw blade trained over the wheels so that rotation of the wheels rotates the band saw blade across the worktable. The bandsaw blade defines a cutting edge and a non-cutting edge, and first and second side surfaces. The system further includes a first blade tensioning device that includes a base movably supported by the frame and a rotational bearing rotatably mounted on the base. The rotational bearing defines an annular bearing surface. The rotational bearing is adjustably positioned to be in continuous rotational contact with the first or second side surface of the blade and to exert a continuous biasing force against the first or second side surface of the blade to offset the path of the blade a selected distance.

In accordance with another aspect of the present invention, a system for cutting a multi-walled material is provided. The system includes a frame, a worktable supported on the frame, a pair of wheels rotatably carried by the frame, and a bandsaw blade trained over the wheels so that rotation of the wheels rotates the band saw blade through an opening. The bandsaw blade defines a cutting edge and a non-cutting edge, and first and second side surfaces. The cutting edge defines alternating first and second sections of teeth, the first sections of teeth being set and the second sections of teeth being unset.

In accordance with still another aspect of the present invention, a method of providing a cutting system for cutting a multi-walled material is provided. The method includes obtaining a bandsaw that includes a frame, a worktable supported on the frame and a pair of wheels rotatably carried by the frame. A bandsaw blade is trained over the wheels so that rotation of the wheels rotates the band saw blade through an opening. The bandsaw blade defines a cutting edge and a non-cutting edge, and first and second side surfaces. A biasing force is then imparted against the bandsaw blade in a direction orthogonal to the cutting edge.

In accordance with yet another aspect of the present invention, a method for cutting a multi-walled material is provided. The method includes installing a bandsaw blade on a bandsaw that includes a frame, a worktable supported on the frame, and a pair of wheels rotatably carried by the frame. The bandsaw blade installed on the bandsaw defines a cutting edge and a non-cutting edge, and first and second side surfaces. The cutting edge defines alternating first and second sections of teeth, the first sections of teeth being set and the second sections of teeth being unset. The bandsaw is then operated for cutting the multi-walled material.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2 is a partial view of a section of the blade employed by the system of FIG. 1;

FIG. 3 is a plan view of a portion of the blade section of FIG. 2;

DETAILED DESCRIPTION OF THE PREFERRED EMBODIMENTS

The present invention will now be described with reference to the accompanying drawings where like numerals correspond to like elements. The present invention is directed to a process of cutting thick fibrous material, such as thick multi-walled corrugated material, with a bandsaw employing an improved bandsaw blade. The term "thick" herein is used to denote 1–40 plies of corrugated material or more or its associated thickness. The present invention is further directed to a system that applies a tension force against the blade during operation for obtaining a straighter cut than may be previously obtained by conventional cutting techniques. While the present invention is explained below and illustrated herein for cutting thick multi-walled corrugated material, it will be appreciated that aspects of the present invention may be utilized to cut other rigid or semi-rigid material, such as wood products, plastics (e.g. PET, PVC, etc.), Styrofoam, wall board, gypsum board, etc. Accordingly, the following descriptions and illustrations herein should be considered illustrative in nature, and not limiting the scope of the present invention, as claimed.

Figure 1:
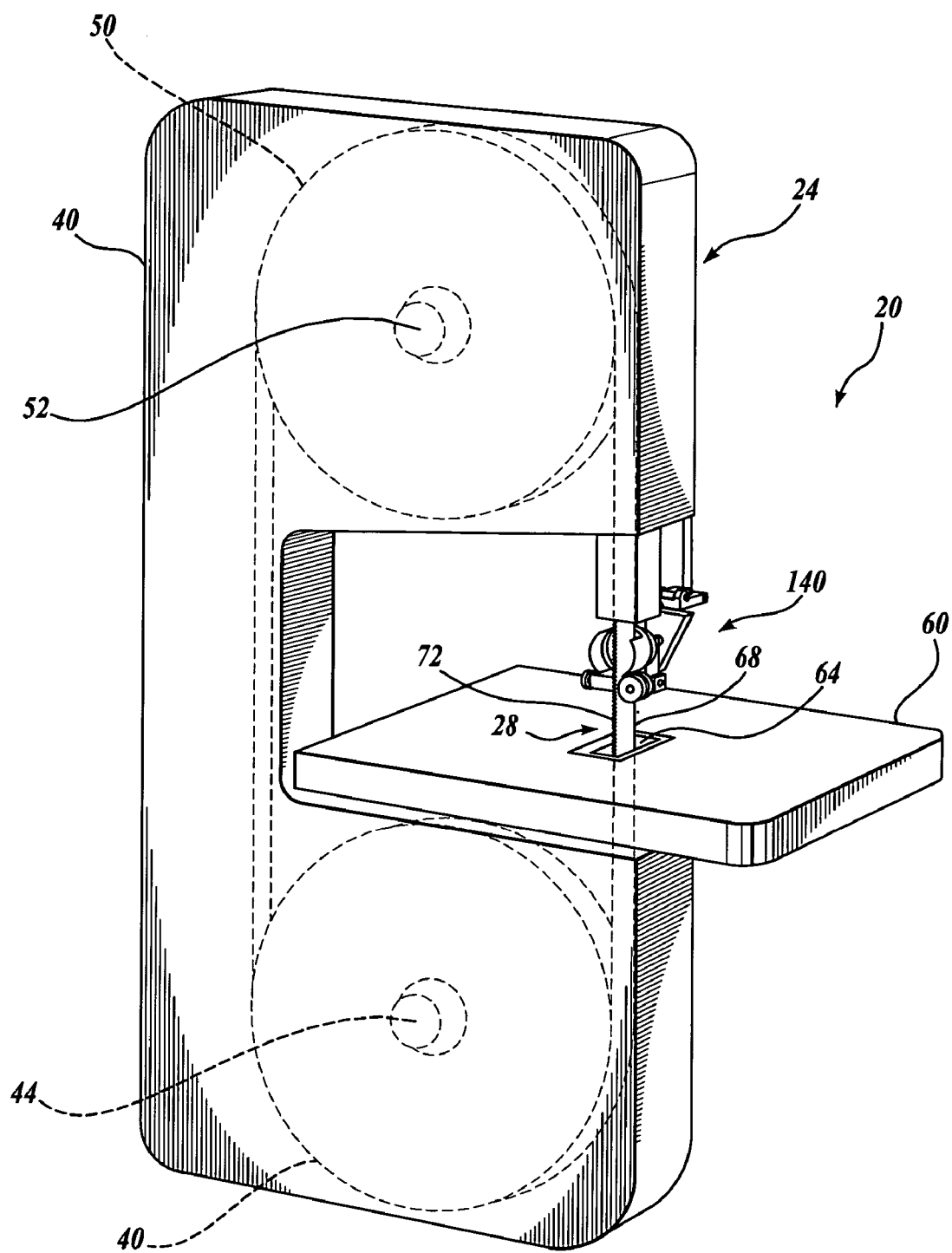
FIG. 1 is a perspective view of an illustrative material cutting system formed in accordance with principles of the present invention.

FIG. 1 is a perspective view of a representative embodiment of a multi-walled material cutting system 20 (hereinafter "the system 20"), constructed in accordance with principles of the present invention. The system 20 includes a bandsaw 24 employing a saw blade 28 with an improved cutting edge 72. As will be described in detail below, the system 20 may employ an upper tensioning assembly 140 and/or a lower tensioning assembly 144 (see FIGS. 5 and 6) to offset the blade 28 with respect to conventional bandsaw arrangements for applying a continuous tensioning force against the blade 28 during use. In use, the system 20 increases the quality of the cut and provides a straighter cut while decreasing the amount of dust generated in the cutting process as compared to conventional methods, namely, the use of circular saws.

As best shown in FIG. 1, the bandsaw 24 of the system 20 includes a frame 40 from which the various functional mechanisms of the saw are supported. The frame 40 houses a rotatable bottom wheel 44 carried on a shaft 46 journaled in the frame 40 and a rotatable upper wheel 50 carried on a shaft 52 journaled in the frame 40. A worktable 60 is supported on the frame 40 and includes an aperture 64. The worktable 60 is adjustable horizontally as well as being adjustable so that it can be positioned horizontally or at various angles. The blade 28 is constructed in the form of a continuous metal band and is trained about bottom wheel 44 and upper wheel 50, extending through aperture 64 of the worktable 60. The bottom wheel 44 is driven by a motor (not shown), either with a belt drive or direct drive, so that the wheel 44 rotates when the motor is operated to cause blade 28 to rotate. This provides a cutting action for cutting a workpiece W (see FIG. 5) supported on table 60. The blade 28 defines a non-cutting edge 68 formed along its back longitudinal edge and a cutting edge 72 formed along its front longitudinal edge.

Figure 4:
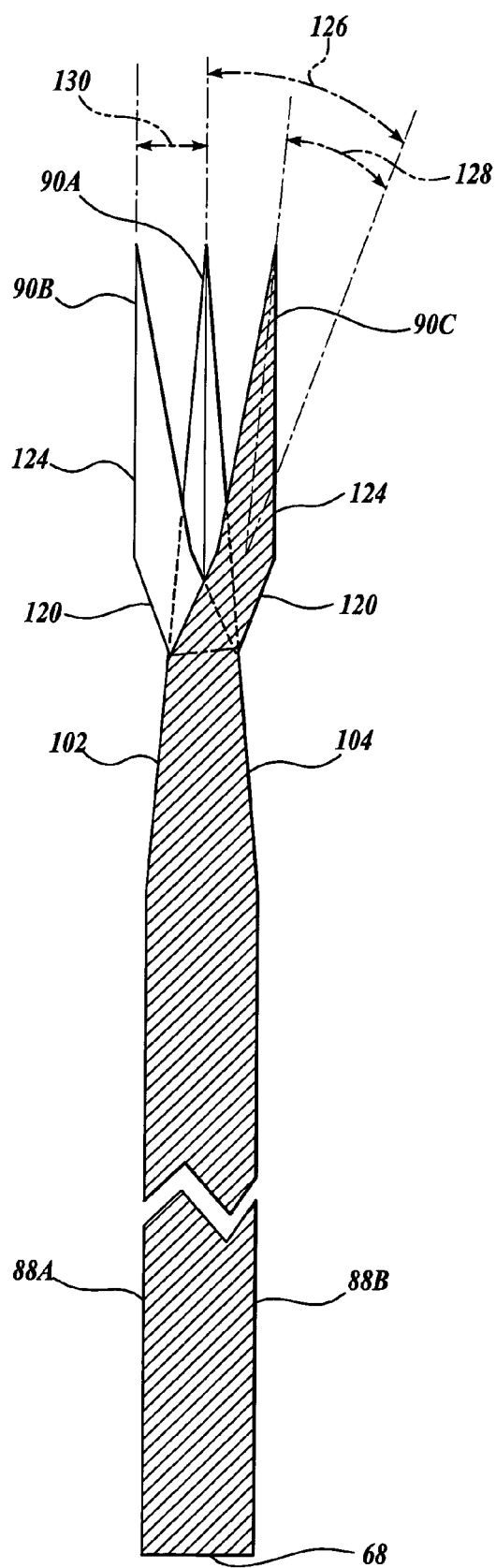
FIG. 4 is a side cross-section view taken along the lines 4—4 of FIG. 2.

In one embodiment of the present invention, the cutting edge 72 of the blade 68 may employ an improved teeth configuration, as will now be explained. Turning now to FIGS. 2–4, there is shown a section of one exemplary embodiment of a saw blade 28, formed in accordance with principals of the present invention. The saw blade 28 has a blade body of generally rectangular cross section, forming the back or non-cutting edge 68, and planar opposed, parallel side surfaces 88A and 88B which extend forwardly of the back edge 68. In one embodiment, the blade body is approximately 0.035 inches thick, approximately 1½ inches wide, and has a sufficient length for use with a 36 inch bandsaw. The cutting edge 72 of the blade 28 is provided with evenly spaced scalloped or serrated teeth, generally designated 90. The teeth 90 of formed by successive concave arcuate edges 94 which define valleys 96, of which adjacent edges converge upwardly to form the tip 98 of each tooth. The edges 94 between the tips 98 of the teeth 90 are sharpened from both sides, so that each of the arcuate edges 94 is provided with crescent shaped beveled surfaces 102 and 104.

The blade 28 is configured with alternating sections of teeth which are unset, that is, in the same plane as the non-cutting edge 68, and sections of teeth that are set, that is, bent laterally to either the right, i.e.; "right set", or to the left, i.e.; "left set", when looking at the blade in plan (see FIG. 3). In the embodiment shown (FIG. 3), each section of set teeth includes a pair of teeth bent laterally in opposing directions so as to form one pair of left-set and right-set teeth 90B and 90C, irrespective of order. Thus, the continuous cutting edge 72 of the blade 28 alternates with a section 108 of set teeth composed of one left set tooth 90B and one right set tooth 90C and an unset section 110 comprised of a plurality of unset teeth 90A. It will be appreciated that the distance between sections 108 of set teeth may vary, depending on types of applications and feed rate. For example, experiments have shown that with feed rates of 60 feet per minute (fpm), a distance of approximately 5 inches is preferred, while with feed rates of 30 fpm, a distance of approximately 10 inches is preferred, although other spacings between 1 to 20 inches may be used. In addition to the varying distance between sections 108, it will be appreciated that the number of teeth may also vary accordingly. Similarly, the number of left set teeth 90B and right set teeth 90C in the set section 108 need not be limited to a pair, but may include three or more teeth that are either alternatingly set or set in one of many patterns (e.g. right set, right set, left set, left set).

In one embodiment, as shown best in FIG. 4, the left and right set teeth 90B–90C are each formed with an intermediate portion 120 and a distal tip portion 124. The intermediate portion 120 is slanted outwardly at an acute angle 126, which is formed between the central axis of the unset teeth 90A and the central axis of the intermediate portion 120 of the set tooth 90C. The distal tip portion 124 extends from the intermediate portion 120 in a slanted manner toward the unset teeth 90A so as to form an acute angle 128 between the central axis of the intermediate portion and the central axis of distal tip portion 124. As such, the lateral distance 128 between the tip of the set tooth 90B or 90C and the tip of the unset teeth 90A is represented by numeral 130. It will be appreciated that distance 130 is one-half the value of the kerf formed by the blade 28 when cutting through a surface and may be between 0.0180 and 0.0375 inches.

Cutting multi-walled corrugated material with a bandsaw employing the blade 28 provides at least the following benefits. First, a large majority of the cutting is done by the unset teeth 90A, and thus, a clean cut is accomplished with little to no dust generated. Additionally, the section 108 of set teeth enable the blade body to pass through the corrugated plies substantially reducing or negating any binding on the blade typically caused by the material, thereby resulting in a straighter cut. The low number of set teeth 90B and 90C also provides the added benefit of only generating a manageable amount of dust.

In accordance with one aspect of the present invention, the system 20 may include upper and/or lower tensioning assemblies 140 and 144 for improving the system's ability to cut multi-walled material in a straight line, as will now be described in detail. The upper tensioning assembly 140 and the lower tensioning assembly 144 are substantially identical. Thus, for ease in the following description, only the upper tensioning assembly 140 will be described. However, identical components of the lower tensioning assembly 144 have been given the same reference numbers but with an "L" instead of a "U" throughout the figures.

Figure 5:
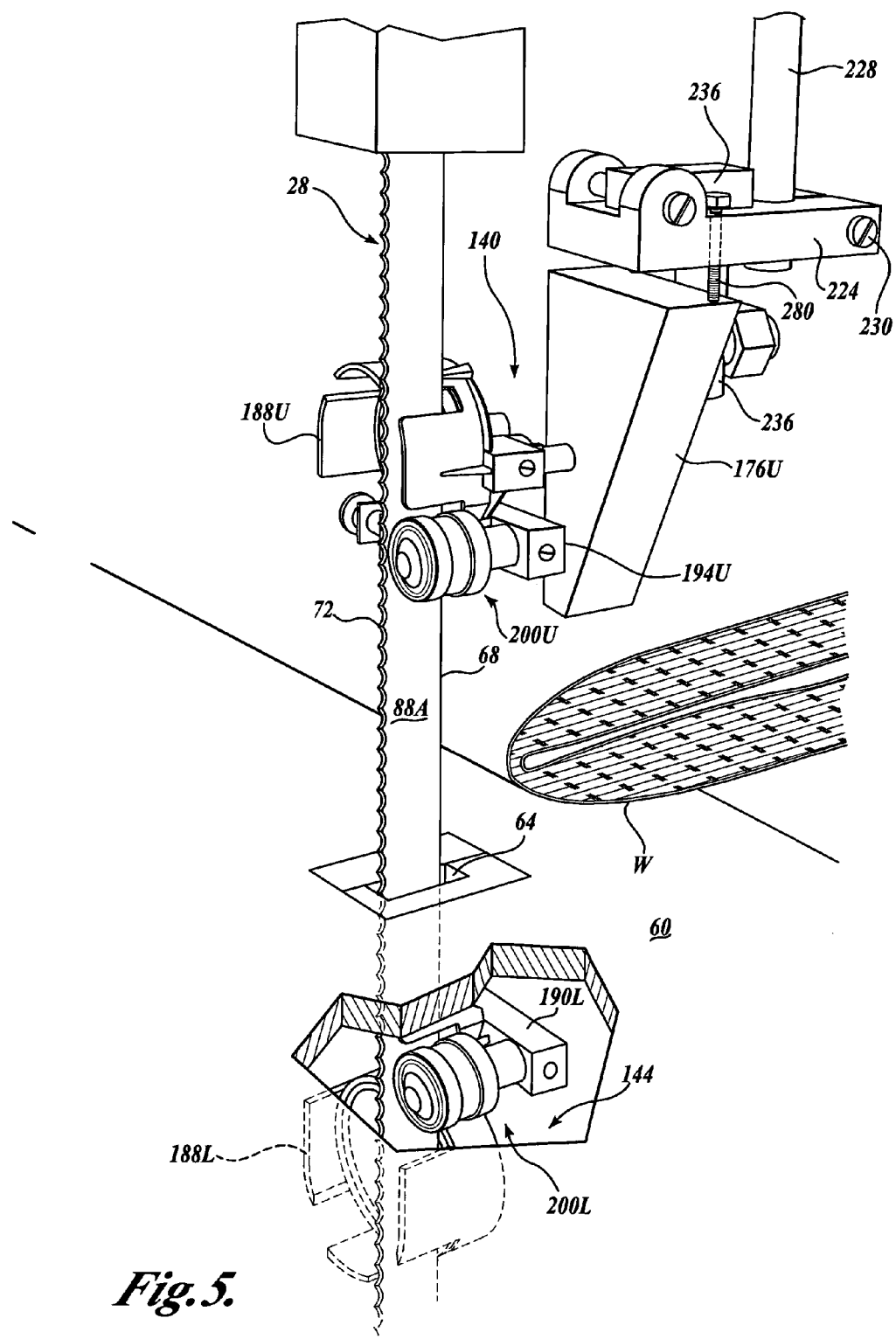
FIG. 5 is a magnified view of the tensioning device of the system shown in FIG. 1.
Figure 6:
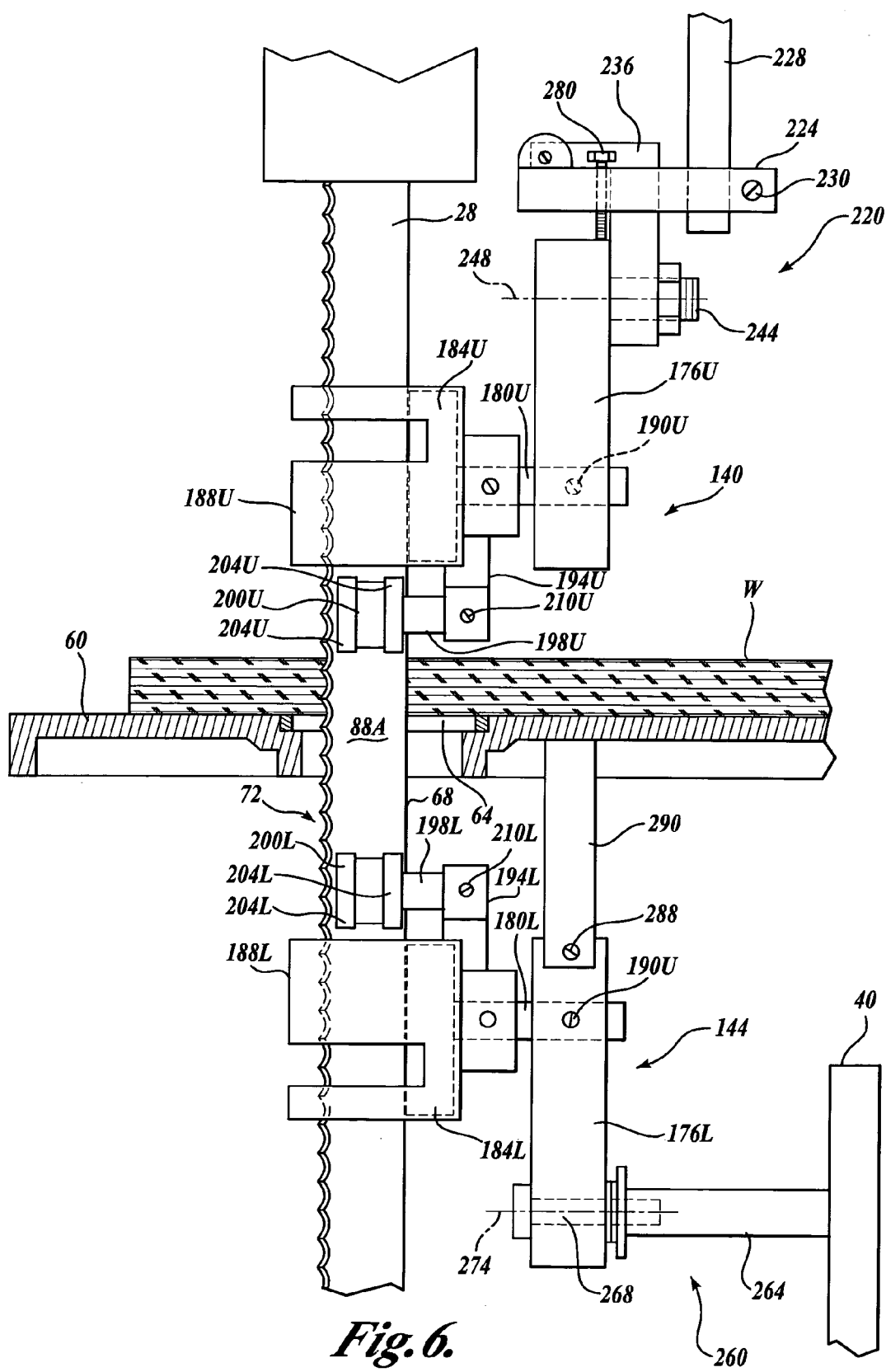
FIG. 6 is a partial side cross-sectional view of the system shown in FIG. 1.

Referring to FIGS. 5 and 6, the upper tensioning assembly 140 includes an upper support base 176U, which extends vertically in a downward manner, parallel to the blade 28. The upper support base 176U includes a first bore that carries a shaft 180U connected to an optional thrust bearing 184U. In the embodiment shown, the thrust bearing 184U is housed in a shroud 188U. The thrust bearing 184U may either be rotatably mounted or fixed on the shaft 180U, or may be connected to the upper support base 176U in any other manner known in the art. The shaft 180U can be adjusted to various positions in the upper support base 176U, and is held in place by set screw 190U. Turning now to FIG. 6, which illustrates a magnified view of the worktable station of the bandsaw 24 in detail, the upper thrust bearing 184U is supported on the upper support base 176U and positioned with its front surface adjacent to and slightly spaced from the non-cutting edge 68 of blade 28.

The upper tensioning assembly 140 further includes a bracket 194U which may be connected either to the upper support base 176U or the shroud 188U (as shown). The bracket 194U includes a bore that carries a shaft 198U on which a roller bearing 200U is rotatably connected. The roller bearing 200U defines a continuous annular outer bearing surface 204U. The shaft 198U can be adjusted to various positions in the bore and held in place by set screw 210U. It will be appreciated that the upper tensioning assembly 140 may also include guide structures known in the art. For example, on the side of the bracket 194U opposite the roller bearing 200U, a guide block (not shown) may be adjustably mounted thereto as known in the art. The guide block (not shown) thus serves to restrict or limit lateral or sideways movement of blade 28 in the direction opposite the roller bearing 200U while a workpiece is being cut. It will be appreciated that the guide block can be adjusted to various positions relative to the blade 28 and may be retained in a selected position in the bracket by mechanical means, such as a set screw.

The upper and lower tensioning assemblies 140 and 144 are movably supported by the frame 40 in a manner that will now be described in detail. The upper tensioning assembly 140 is movably supported by the frame 40 via an upper support assembly 220. The upper support assembly 220 includes a horizontally oriented upper support bracket 224. The upper support bracket 224 includes a slotted bore through which the lower end of a guide post 228 is routed. The size of the slotted bore may be adjusted by a tensioning screw 230 for fixedly securing the upper support bracket 224 to the guide post 230 is a selected position. The upper support bracket 224 includes a second, unslotted bore that carries an L-shaped mounting post 236. The lower end of the mounting post 236 includes a bore that rotatably carries an extension pin 244, which protruding from the upper end of the upper support base 176U. Thus, the upper support base 176U of the upper tensioning assembly 140 is connected to the mounting post 236 and is free to rotate about the central axis 248 of the mounting post bore. The upper end of the guide post 228 is supported on the frame 40 in back of the blade 28 by a guide post bracket (not shown). The guide post 228 is adjustably connected to the guide post bracket, and is held at a selected position by mechanical means, such as a locking screw (not shown).

The lower tensioning assembly 144 is movably supported to the frame 40 by a lower support assembly 260. The lower support assembly 260 includes a lower support member 264 rigidly connected at one end to a portion of the frame 40. The lower support member 264 extends horizontally from the frame 40, and includes a threaded bore at its opposite end. The lower end of the lower support base 176L includes a bore, which is utilized for connecting the lower tensioning assembly 144 to the lower support bracket 264. In the embodiment shown, a threaded fastener, such as bolt 268, is routed through the lower support base bore and is threadably connected to the threaded bore of the lower support member 264. Thus, the bolt 268 maintains the connection between the lower support base 176L and the lower support member 264, and allows the lower support base 176L to rotate about the central axis 274 of the bolt 268.

Figures 7A, 7B:
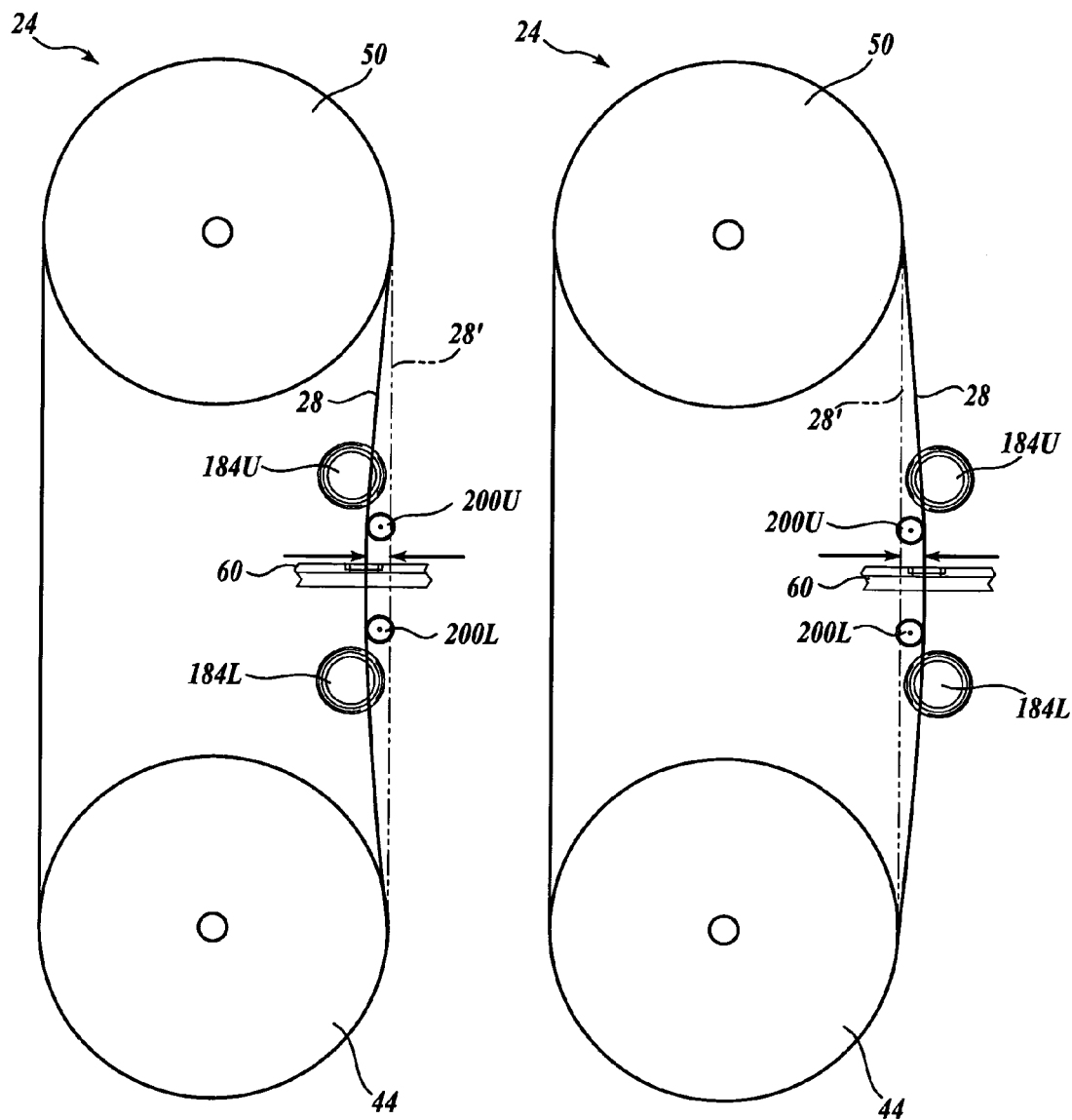
FIGS. 7A and 7B are schematic views of the bandsaw blade illustrating offset or tensioned positions.

FIG. 7A is schematic views of the bandsaw 24 of FIG. 1 illustrating the manner in which the roller bearings 200U and 200L are positioned relative to the blade 28, one on each side of the worktable 60. FIG. 7A also illustrates the manner in which the thrust bearings 184U and 184L are located behind the blade 28 so as to restrict rearward movement of the blade 28 while a workpiece is being cut, with one thrust bearing located above the worktable 60 and the other located below the worktable 60.

As was briefly discussed above, the upper and lower tensioning assemblies 140 and 144 impart a tensioning force against the blade 28. As best shown in FIGS. 5, 6 and 7A, to impart a continuous tensioning force against the blade 28, the bearing surfaces 204U and 204L of the roller bearings 200U and 200L, respectively, are moved against the side surface 88A (see FIG. 6) of the blade 28 by selectively rotating the upper and lower support bases 176U and 176L with respect to the mounting post 236 and the lower support member 264, respectively. The upper support base 176U is selectively rotated about the axis 248 by translation of an adjustment screw 280 threadably connected to the upper support bracket 224. When rotated in the appropriate direction, the adjustment screw 280 contacts the top surface of the upper support base 176U at a location spaced from the rotational axis of the upper support base 176U, thereby rotating the upper tensioning assembly 140 about the axis 248. The lower support base 176L is selectively rotated about the axis 274 by translation of an adjustment screw 288 threadably connected to a bracket 290 downwardly depending from the worktable 60. When rotated in the appropriate direction, the adjustment screw 288 translates in a direction perpendicular to the side surface 88A of the blade and contacts the upper end of the lower support base 176L, thereby rotating the lower tensioning assembly 144 about the bolt 268.

The upper and lower tensioning assemblies 140 and 144 may continue to be rotated against the side surface 88 of the blade 28 by translation of the adjustment screws 280 and 288, respectively, until a selected offset is achieved. The term "offset" is used herein to connote the relationship between the blade pre-tensioned versus the blade post-tensioned. As best shown in FIG. 7A, the blade pre-tensioned by the roller bearings 200U and 200L is illustrated in phantom. The pre-tensioned blade 28' runs substantially vertical between the bottom and upper wheels 44 and 50. When the blade 28 is tensioned by the tensioning assemblies 140 and 144, wherein the roller bearings 200U and 200L impart continuous biasing forces against the side surface 88A of the blade 28 (i.e.; the annular bearing surface provides a continuous rolling contact against the blade), the path of the blade 28 as it runs between the bottom and upper wheels 44 and 50 is somewhat arcuate, but substantially vertical between the upper and lower bearings 200U and 200L. Thus, an offset distance is formed between the pre-tensioned blade 28' and the post-tensioned blade 28 and is represented by the arrows in FIG. 7A. In embodiments of the present invention, offset distances of approximately 0.25 inch to approximately 1.00 inch are contemplated.

While the system 20 has been explained above and illustrated herein as using a bandsaw 24 with an improved saw blade 28 and upper and/or lower tensioning assemblies 140 and 144 for imparting a biasing force against the blade 28, it will be appreciated that the bandsaw 24 having a tensioning assembly or assemblies may employ bandsaw blades of conventional design or that the bandsaw 24 may employ the improved bandsaw blade without utilizing the tensioning assemblies.

While the preferred embodiments of the invention have been illustrated and described, it will be appreciated that various changes can be made therein without departing from the spirit and scope of the invention. For example, while the tensioning assemblies have been illustrated herein for biasing the bandsaw blade inward toward the frame, it will be appreciated that the upper and lower tensioning assemblies may be positioned such that the roller bearings bias the bandsaw blade outward from the frame, as best shown in FIG. 7B.

The embodiments of the invention in which an exclusive property or privilege is claimed are defined as follows:

1. A method of providing a cutting system for cutting a multi-walled material, comprising:
   obtaining a bandsaw including a frame, a worktable supported on the frame and defining an opening, and a pair of wheels rotatably carried by the frame;
   training a bandsaw blade over the wheels so that rotation of the wheels rotates the band saw blade through the opening, the bandsaw blade defining a cutting edge and a non-cutting edge, and first and second side surfaces; and
   imparting a biasing force against the bandsaw blade in a direction orthogonal to the cutting edge such that the bandsaw blade is moved an offset distance without twisting the bandsaw blade.

2. The method of claim 1, further including operating the bandsaw for cutting the multi-walled material.

3. The method of claim 1, wherein imparting a tensioning force against the blade forms an offset distance between the biased blade position and a position of the blade absent the biasing force.

4. The method of claim 3, wherein the offset distance in between 0.25–1.00 inches.

5. The method of claim 1, wherein the cutting edge defines a first section of unset teeth and a first section of set teeth, the first section of set teeth including at least one right set tooth and at least one left set tooth.

6. The method of claim 5, wherein the first sections of unset teeth and set teeth continuously alternate around the bandsaw blade cutting edge.

7. The method of claim 5, wherein the right set tooth or left set tooth includes an intermediate portion extending in a slanting manner to form an acute angle between a central axis of the intermediate portion and a central axis of the blade, and a distal tip portion extending from the intermediate portion in a slanting manner toward the central axis of the blade, the distal tip portion forming an acute angle between the central axis of the intermediate portion and a central axis of the distal tip portion.

8. A system for cutting a multi-walled material, comprising: a frame;
   a worktable supported on the frame, the worktable defining an opening;
   a pair of wheels rotatably carried by the frame;
   a bandsaw blade trained over the wheels so that rotation of the wheels rotates the band saw blade across the worktable, the bandsaw blade defining a cutting edge and a non-cutting edge, and first and second side surfaces; and
   a first blade tensioning device including a base movably supported by the frame and a rotational bearing rotatably mounted on the base, the rotational bearing defining an annular bearing surface, wherein the rotational bearing is adjustably positioned to be in continuous rotational contact with the first or second side surface of the blade and to exert a continuous biasing force against the first or second side surface of the blade to offset the path of the blade a selected distance.

9. The system of claim 8, wherein the base selectively rotates with respect to the frame for contacting the bearing surface of the rotational bearing against the blade.

10. The system of claim 8, wherein the first tensioning device further includes a thrust bearing, the thrust bearing being positioned a selected distance from the non-cutting edge of the blade.

11. The system of claim 10, wherein the thrust bearing is coupled to the base.

12. The system of claim 8, further comprising a second tensioning device mounted on the side of the worktable opposite the first tensioning device.

13. The system of claim 8, wherein the cutting edge of the bandsaw is serrated to form a plurality of teeth.

14. The system of claim 8, wherein the cutting edge of the bandsaw blade defines a first section of unset teeth and a first section of set teeth, the first section of set teeth including at least one right set tooth and one left set tooth.

15. The system of claim 14, wherein the first sections of unset teeth and set teeth continuously alternate around the bandsaw blade cutting edge.

16. The system of claim 14, wherein the right set tooth or left set tooth includes an intermediate portion extending in a slanting manner to form an acute angle between a central axis of the intermediate portion and a central axis of the blade, and a distal tip portion extending from the intermediate portion in a slanting manner toward the central axis of the blade, the distal tip portion forming an acute angle between the central axis of the intermediate portion and a central axis of the distal tip portion.

17. The system of claim 14, wherein the set teeth and the unset teeth define tips, the lateral distance formed between the tip of one of the unset teeth and the tip of one of the set teeth is between 0.0180 and 0.0375 inches.

18. The system of claim 14, wherein the longitudinal distance of the first section of unset teeth is between approximately 4 and 20 inches.

* * * * *